United States Patent [19]

Gupta et al.

[11] Patent Number: 5,614,245
[45] Date of Patent: Mar. 25, 1997

[54] WATER-CONTINUOUS SPREAD

[75] Inventors: Bharat B. Gupta, Bath; Stefan Kasapis, Putnoe, both of United Kingdom

[73] Assignee: St. Ivel Limited, London, United Kingdom

[21] Appl. No.: 405,544

[22] Filed: Mar. 16, 1995

[30] Foreign Application Priority Data

Mar. 17, 1994 [GB] United Kingdom .................... 9405235

[51] Int. Cl.$^6$ .................................................... A23D 7/015
[52] U.S. Cl. .......................... 426/602; 426/804; 426/601
[58] Field of Search ................................... 426/601–604, 426/804

[56] References Cited

U.S. PATENT DOCUMENTS

| | | | |
|---|---|---|---|
| 4,094,872 | 3/1992 | Furcsek | 426/804 |
| 4,917,915 | 4/1990 | Cain | 426/602 |
| 4,956,193 | 9/1990 | Cain | 426/602 |
| 5,279,844 | 1/1994 | Wesdorp | 426/804 |
| 5,294,455 | 3/1994 | O'Brien | 426/603 |
| 5,338,560 | 8/1994 | Wesdorp | 426/603 |
| 5,464,645 | 11/1995 | Wesdorp | 426/603 |

FOREIGN PATENT DOCUMENTS

| | | |
|---|---|---|
| 0256712A1 | 2/1988 | European Pat. Off. . |
| 0283101A1 | 9/1988 | European Pat. Off. . |
| 0298561A2 | 1/1989 | European Pat. Off. . |
| 0327225A2 | 8/1989 | European Pat. Off. . |
| 0340857A1 | 11/1989 | European Pat. Off. . |
| 0441494A1 | 8/1991 | European Pat. Off. . |
| 0509707A1 | 10/1992 | European Pat. Off. . |
| 2580471A1 | 10/1986 | France . |
| 57-68738 | 4/1982 | Japan . |
| 1455146 | 11/1976 | United Kingdom . |
| 2011942 | 7/1979 | United Kingdom . |
| 2020532 | 11/1979 | United Kingdom . |
| 2229077 | 9/1990 | United Kingdom . |

*Primary Examiner*—Carolyn Paden
*Attorney, Agent, or Firm*—Malcolm B. Wittenberg

[57] ABSTRACT

A spread is provided which is a water-continuous dispersion comprising a continuous aqueous phase and optionally a dispersed fat phase. The continuous aqueous phase comprises a gelling maltodextrin and an aggregate-forming proteinaceous gelling agent. The dispersed fat phase, if present, contains no more than 20% of fat by weight of the spread. The components of the spread are selected so that the spread has a ratio of plastic stress to maximum stress ($\sigma p/\sigma max$) in the range 0.95 to 1, when measured by compression analysis at 5° C., typically using samples of cylindrical shape, measuring 26 mm in length and 26 mm in diameter, which are compressed at a rate of 0.8 mm per second. The spreads show characteristic rheological parameters comparable to those of an idealised plastic dispersion, and have good spreading properties at all temperatures from 4° C. to 25° C. They are suitable for use as a substitute for butter or margarine and show good microbiological stability.

22 Claims, 14 Drawing Sheets

WATER-CONTINUOUS SPREAD

The present invention relates to water-continuous spreads which have a very low or zero fat content and which are suitable for spreading on bread.

BACKGROUND OF THE INVENTION

Low fat spreads which have been generally on the market for several years are fat-continuous emulsions having a fat content of around 20 to 40%. EP-A-0256712 and EP-A-0327225 of the present applicants disclose water-in-oil emulsion low fat spreads with a fat content of 18 to 35%, in which small amounts of modified starch are added to milk protein-containing aqueous phases. As the starch content is increased, the protein content of the aqueous phase can be decreased. This allowed the production of milk-protein-containing low fat spreads of 25% fat content.

Various attempts have also been made to produce water-continuous low fat spreads having a very low fat content, i.e. less than 20% fat. Very low fat milk protein-containing water-continuous emulsions are disclosed in the following documents although not all of the emulsions are useful for spreading on bread as a substitute for butter or margarine: EP-A-0340857, EP-A-0283101, EP-A-0441494, EP0509707, GB-A-2229077, and FR-A-2580471. Besides these documents, there are at least three water-continuous very low fat spreads on the market in the UK, two of which contain only 5% of fat, and one contains only 3% of fat.

As a further example, EP-A-0298561 discloses edible plastic dispersions which may be formulated as very low fat spreads which are water-continuous emulsions. In order to form these plastic dispersions, two gelling agents are required, at least one of which must be an aggregate-forming gelling agent. A key feature of EP-A-0298561 is the requirement to formulate the edible dispersions so that they have a defined plastic rheology. EP-A-0298561 uses the known rheological technique of compression analysis (see for example Dairy Rheology:A Concise Guide, by J. H. Prentice, published by VCH Publishers, 1992) to analyse the stress/strain characteristics of the dispersions produced.

Referring to FIG. 1 of the present application, a graph of stress vs. strain is shown for ideal product behaviour under compression analysis for each of the following products: a hydrocolloid gel, a plastic dispersion, and a viscous solution.

The characterising features of the stress/strain profile are as follows:
- the maximum stress ($\sigma max$), which is the point where the stress goes through a maximum value (this may in practice be a shoulder on the profile rather than a peak);
- the maximum strain ($\epsilon max$), which is the strain at the maximum stress ($\sigma max$);
- the plastic stress ($\sigma p$), which is the stress at a horizontal or near-horizontal portion of the curve at a strain slightly larger than the maximum strain; and
- the inflectional stress ($\sigma i$), which is the point where the stress goes through a minimum value at a strain larger than the maximum strain.

The ratio of the plastic stress to the maximum stress ($\sigma p/\sigma max$) of a plastic dispersion will clearly be much greater than the ratio of the inflectional stress to the maximum stress ($\sigma i/\sigma max$) of a hydrocolloid gel. The maximum strain ($\epsilon max$) for hydrocolloid gels will occur over a wide range of strain values (0.1 to 1.0) depending on the elastic or brittle nature of the gel network. Viscous solutions produce a smooth stress/strain profile with no apparent signs of yield points on the curve during the compression cycle.

According to EP 0298561, the ratio of the plastic stress to the maximum stress ($\sigma p/\sigma max$) is preferably 0.2 to 0.95, more preferably 0.3 to 0.8.

It is highly important in the field of low fat spreads to generate products of good spreading properties; these will have textural profiles closely resembling the stress-strain relationship illustrated for the idealised plastic dispersion of FIG. 1. It is generally recognised by those skilled in the art that two of the spreadable foods showing the most favoured spreading properties are butter and a full fat soft cheese, such as that known by the trade name of "Philadelphia". These products are respectively a fat-continuous emulsion and a water-continuous emulsion, and both show stress-strain profiles similar to the idealised plastic dispersion of FIG. 1. None of the very low fat spreadable products available on the market exhibits rheological parameters comparable to those of the idealised plastic dispersion of FIG. 1.

SUMMARY OF THE INVENTION

The present applicants have now found that a water-continuous spread can be produced which has a very low fat content, which shows characteristic rheological parameters comparable to those of an idealised plastic dispersion, and which has good spreading properties at all temperatures from 4° C. to 25° C. The present invention provides a spread which is a water-continuous dispersion comprising a continuous aqueous phase and optionally a dispersed fat phase. The continuous aqueous phase comprises a gelling maltodextrin and an aggregate-forming proteinaceous gelling agent. The dispersed fat phase, if present, contains no more than 20% of fat by weight of the spread. The components of the spread are selected so that the spread has a ratio of plastic stress to maximum stress ($\sigma p/\sigma max$) in the range 0.95 to 1, when measured by compression analysis at 5° C., typically using samples of cylindrical shape, measuring 26 mm in length and 26 mm in diameter, which are compressed at a rate of 0.8 mm per second.

The present applicants believe that the $\sigma p/\sigma max$ ratio measured am 5° C. is a most important rheological characteristic when considering spreading properties. The values for this ratio obtained in the present invention are comparable to those of butter and Philadelphia full fat soft cheese. The $\sigma p/\sigma max$ ratios at 5° C. for butter and Philadelphia full fat soft cheese are 1.00 and 0.98 respectively.

The water-continuous spreads in accordance with the present invention are suitable for use as a substitute for butter or margarine. Additionally, the spreads show good microbiological stability. For example, a product made according to the invention showed excellent microbiological stability with respect to gram-positive bacteria, including both aerobic and anaerobic spore-forming bacteria. This was a surprising result because the spread possessed a very high water activity (around 0.98) and would not be expected to be so microbiologically stable. This property is discussed in further detail below.

The fat used in the fat phase of the spread, if present, is selected from milk fat, vegetable oils, vegetable fats, animal fats, hydrogenated vegetable oils or mixtures of any of the foregoing oils or fats. The fat or fats used may have been subjected to a suitable interesterification or fractionation treatment. If milk fat is used, it may be in the form of butter, butteroil, anhydrous milk fat, fractionated milk fat, cream, concentrated cream, or a mixture thereof. If vegetable oils or hydrogenated vegetable oils are used, they may be selected from any of the vegetable oils normally used in the manufacture of margarines and low fat spreads. Typical vegetable oils are rapeseed oil, palm oil, soya oil, sunflower oil, their hydrogenated forms, and mixtures thereof.

Preferably, the amount of fat present in the spread is less than 10% by weight, more preferably the amount of fat present in the spread is in the range 2 to 5% by weight. In order to ensure the adequate dispersion of the fat in the aqueous phase, it is generally necessary to homogenise the emulsion so that the fat is in the form of droplets of 0.1 to 2.0 µm diameter.

Gelling maltodextrins are well known in the field of low fat spreads. According to the present invention, the gelling maltodextrin typically has a dextrose equivalent in the range 1 to 10, preferably in the range 2 to 5. Examples of such gelling malto-dextrins include those known by the trade names Cerestar C*01906, C*01907 and C*01908, Paselli SA2, N-Oil II, Maltrin M040, Lycadex 100, Optagrade and Trimchoice OC.

Gelling maltodextrins in which at least 50% of the structure present at 5° C. is lost at oral temperature (around 37° C.) are preferred because they tend to show better flavour release than gelling maltodextrins in which less than 50% of the structure present at 5° C. is lost at oral temperature. This loss of structure is typically measured when the material is heated at a scan rate of 1° C. per minute, a frequency of 1.6 Hz, and a strain within the linear viscoelastic range (typically 0.5% for maltodextrins). Cerestar C*01906 and Optagrade are examples of the preferred gelling maltodextrins.

Dynamic mechanical measurements of the concentration dependence of the storage modulus (G') and the melting profiles of the above maltodextrin gels in combination with sensory analysis of water-continuous spreads have shown that Cerestar C*01906 is the most efficient structuring agent with the best organoleptic performance. This appears to be linked to a low minimum gelling concentration (cm≈12%) as compared with the cm of the remaining maltodextrins, which form gels only at concentrations higher than 18%. The minimum gelling concentration is typically measured when solutions are cooled from 50° C. to 5° C. at a rate of 1° C. per minute, a frequency of 1.6 Hz, and a strain within the linear viscoelastic region (typically 0.5% for maltodextrins). The solutions are left to set at 5° C. for 90 minutes, thus taking the values of G' at the end of the isothermal run for the concentration/shear modulus dependence and the accurate determination of cm. Employment of C*01906 at reduced concentrations, at which the other maltodextrins cannot serve as structuring agents, therefore produced spreads devoid of the unpleasant starchy oral perception associated with higher amounts of maltodextrin in a product.

The aggregate-forming proteinaceous gelling agent may comprise one or more milk proteins, or a mixture of one or more milk proteins and one or more vegetable proteins. Suitable sources of milk proteins include buttermilk powder, buttermilk concentrate, skim milk powder, skim milk concentrate, whole milk powder, whole milk concentrate, whey protein concentrate, whey protein isolate, or a mixture of caseinates and whey proteins in substantially the same proportions as they occur in milk. The term concentrate in the above is intended to encompass any known method of concentration including ultra-filtration, reverse osmosis, evaporation, and acidification and separation. Suitable sources of vegetable protein include soya protein concentrate and soya protein isolate.

Preferably, the aggregate-forming proteinaceous gelling agent comprises a whole-milk-protein preparation. In this specification a whole-milk-protein preparation is defined as a preparation that contains substantially all of the proteins from milk substantially in their natural proportions.

It has been surprisingly found that whole-milk-protein preparations are particularly good at providing structure in the water phase. This is very important for providing texture in very low fat or zero fat water-continuous spreads. In addition, the use of whole-milk-protein preparations provides a dairy/buttery flavour and enhances the "creaminess" of the spread.

Suitable whole-milk-protein preparations may be prepared by various methods, including any one of the following: (1) Making a solution of whole milk powder or skim milk powder or buttermilk powder or a mixture thereof. (2) Concentrating whole milk or skim milk or buttermilk or a mixture thereof by reverse osmosis, ultrafiltration or evaporation. (3) Heating whole milk or skim milk or buttermilk or a mixture thereof, typically to a temperature of 80° to 115° C. for 1 to 30 minutes;

acidifying the heated preparation, for example by the use of a suitable starter culture or by the addition of a suitable organic acid such as lactic acid or by the addition of a suitable mineral acid;

separating the protein by centrifugal separation or by ultrafiltration. This method is described in further detail in GB-1455146, GB-A-2011942, and GB-A-2020532. (4) Mixing and heat treating a solution of caseinates and whey protein preparations in which the proportion of caseinates to whey proteins is the same as the proportion of casein to whey proteins in milk.

Both the gelling maltodextrin and the proteinaceous gelling agent are aggregate-forming gelling agents. At appropriate concentrations in the aqueous phase, these gelling agents will give rise to a gel composed of aggregates or particles. Usually, for gelling maltodextrins, a concentration in the range 6 to 25% by weight of the aqueous phase may be used, preferably around 8 to 15% by weight of the aqueous phase. As the concentration of the gelling maltodextrin decreases below 15% the taste of the spread improves. The proteinaceous gelling agent is generally present at a concentration that gives a concentration of 1 to 6% of protein by weight of the aqueous phase, preferably 2 to 5% of protein by weight of the aqueous phase.

The spreads of the present invention may also contain minor amounts of non-gelling hydrocolloids, such as xanthan gum, locust bean gum, modified starch, or soluble vegetable fibre such as inulin. The function of xanthan gum or of modified starch is to increase the viscosity of the aqueous phase in order to stabilise the dispersion during the gelation of the main structuring agents (maltodextrin and protein). Typically, xanthan gum is used at a concentration of 0.1 to 0.5% by weight of the aqueous phase, and modified starch is used at a concentration of 0.1 to 2.5% by weight of the aqueous phase. Alternatively, rapid cooling of the spread after manufacture will have the same stabilising effect on the dispersion as the use of xanthan gum or modified starch. The function of locust bean gum or of soluble vegetable fibre is to prevent syneresis. Typically, locust bean gum is used at a concentration of 0.1 to 0.5% by weight of the aqueous phase, and soluble vegetable fibre is used at a concentration of 1 to 7% by weight of the aqueous phase. These functions are well known in the manufacture of spreads and other products.

Other ingredients commonly added to low fat spreads such as salt, preservatives, flavourings and vitamins may also be added.

Whilst gelatin is a widely-used non-aggregate-forming gelling agent in low fat spreads, the present applicants have found that the presence of significant amounts of gelatin can adversely affect the rheological properties of the spread by lowering the σp/σmax ratio and making the spread show a more gel-like character. According to the present invention, if gelatin is present, the amount must be insufficient to cause the σp/σmax ratio to fall below the range 0.95 to 1, when measured at 5° C. Preferably, the spread contains substantially no gelatin. Non-aggregate-forming gelling agents other than gelatin can also adversely affect the rheological properties of the spread and so their amounts should also be kept to a minimum. Preferably, substantially no non-aggregate-forming gelling agents are present in the spread.

A further means for rheologically characterising the spreads of the present invention is in terms of their behaviour in standard creep compliance experiments (see for example Dairy Rheology : A Concise Guide, by J. H. Prentice, published by VCH Publishers, 1992). In this type of analysis, a constant stress is applied to a sample and the generated strain is recorded as a function of time. The imposed stress is then withdrawn and the degree of recovery of the sample is recorded as a function of time. The initial application of stress produces an instantaneous elastic deformation, i.e. one occurring within i second, which varies with the amount of stress applied.

In the case of perfectly elastic solids (e.g. vulcanised rubbers), application of a certain stress results in an instantaneous response (deformation) which does not change throughout the course of the experiment. On removal of the stress the recovery of the strain is virtually complete and the body of the sample returns to its original shape.

However the biopolymer gels used in the production of low fat spreads show viscoelastic behaviour. Part of the biopolymer gel material cannot support the constant stress and moves relative to other macromolecules, so that the sample becomes permanently deformed after the withdrawal of stress.

Typical creep compliance experiments involve the application of a constant shear stress, for a fixed time, to a sample held between two flat, parallel plates of a controlled stress rheometer thus causing an increasing rotation (percentage of sample deformation in relation to its original dimensions) of one plate relative to the other. A useful characterisation of the viscoelastic properties of a low fat spread is the minimum instantaneous deformation required in a creep compliance experiment for the product to exhibit substantially no recovery of shape. Generally speaking, the lower the initial strain required for the spread to exhibit negligible recovery of shape after the removal of stress (relaxation part of the trace), the less gel-like and more plastic the spread is. On the other hand, the higher the initial strain required, the more gel-like and less plastic the spread is.

According to the present invention, the components of the low fat spread are selected so that the spread exhibits less than 0.5% of recovery of strain at the end of a 30 minute relaxation period after having been subjected for 60 minutes to a constant stress which produces an instantaneous initial deformation of 8%.

DESCRIPTION OF THE DRAWINGS

The present invention will now be described in further detail by way of example only with reference to the following Examples and accompanying drawings, in which.

DESCRIPTION OF THE PREFERRED EMBODIMENTS

COMPARATIVE EXAMPLES

Figure 1:
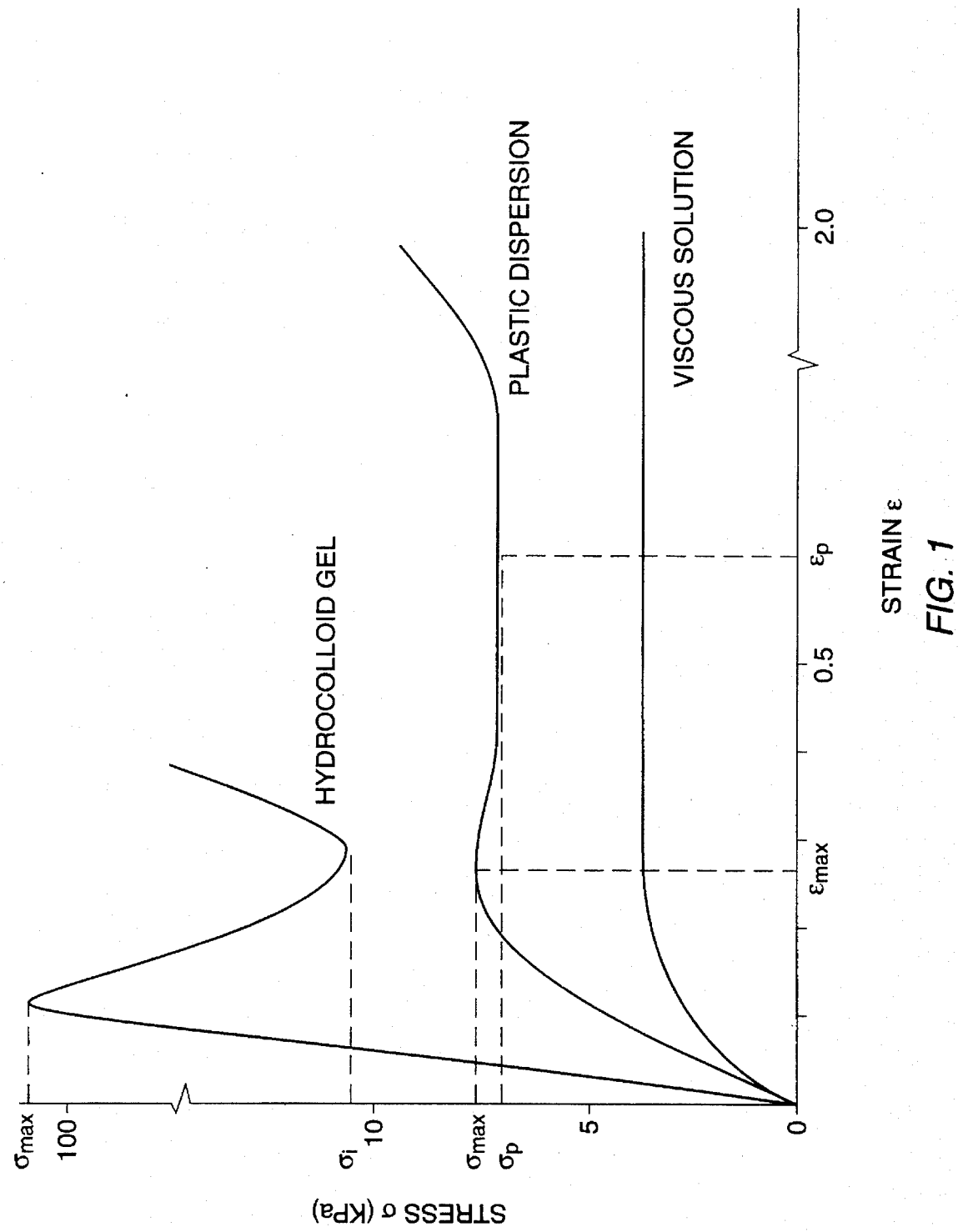
FIG. 1 shows an idealised graph of stress as a function of strain during compression testing of hydrocolloid gels, plastic dispersions and viscous solutions.
Figure 2:
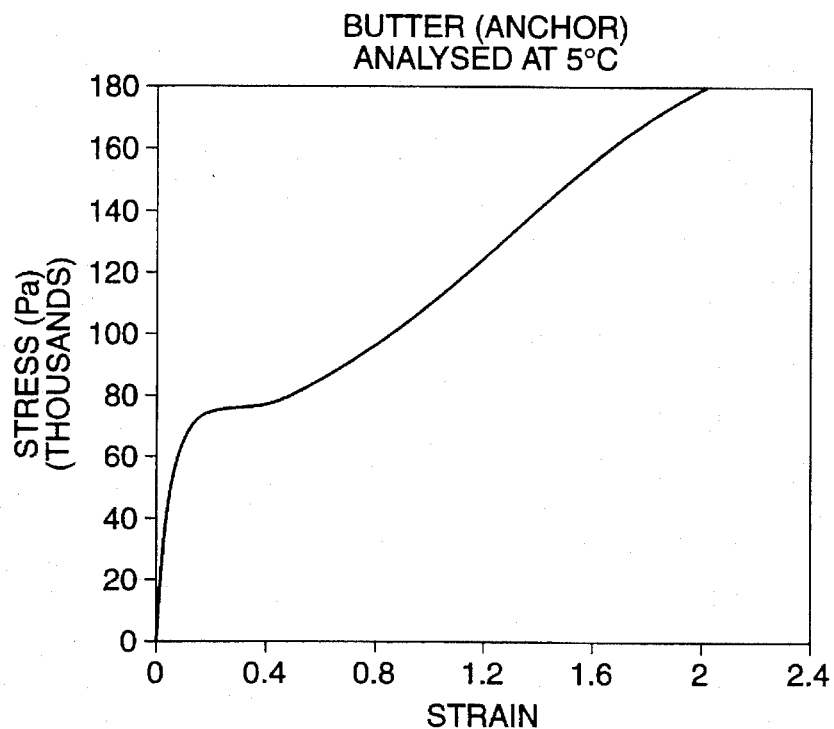
FIG. 2 shows a stress/strain graph of butter under compression analysis.
Figure 3:
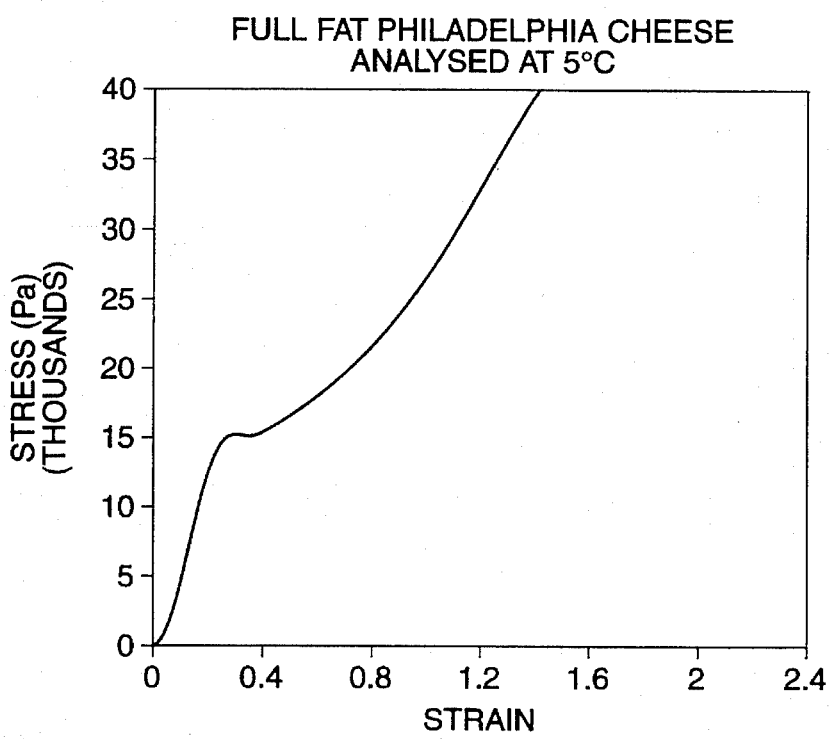
FIG. 3 shows a stress/strain graph of Philadelphia full fat soft cheese under compression analysis.
Figure 4:
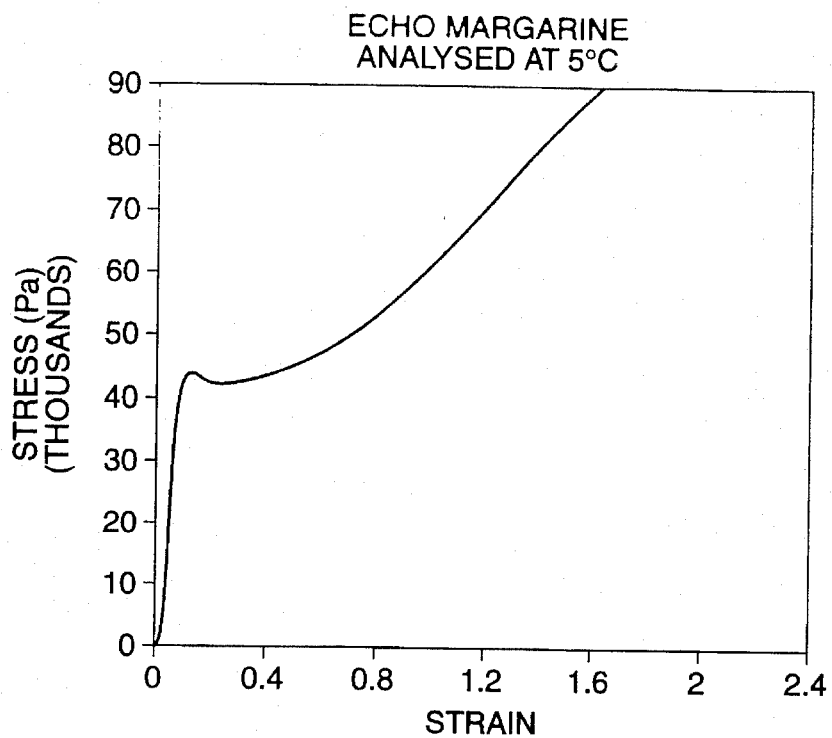
FIG. 4 shows a stress/strain graph of Echo margarine under compression analysis.

The results of compression analysis of various products available to the consumer are presented in FIGS. 2 to 13. FIGS. 2 and 3 relate respectively to butter and Philadelphia full fat soft cheese. In each case it will be noted that there is a sharp rise followed by a horizontal plateau, the plastic stress region. For butter this is also the maximum stress, whereas for Philadelphia there is a slight hump which is taken as the maximum stress.

Figure 5:
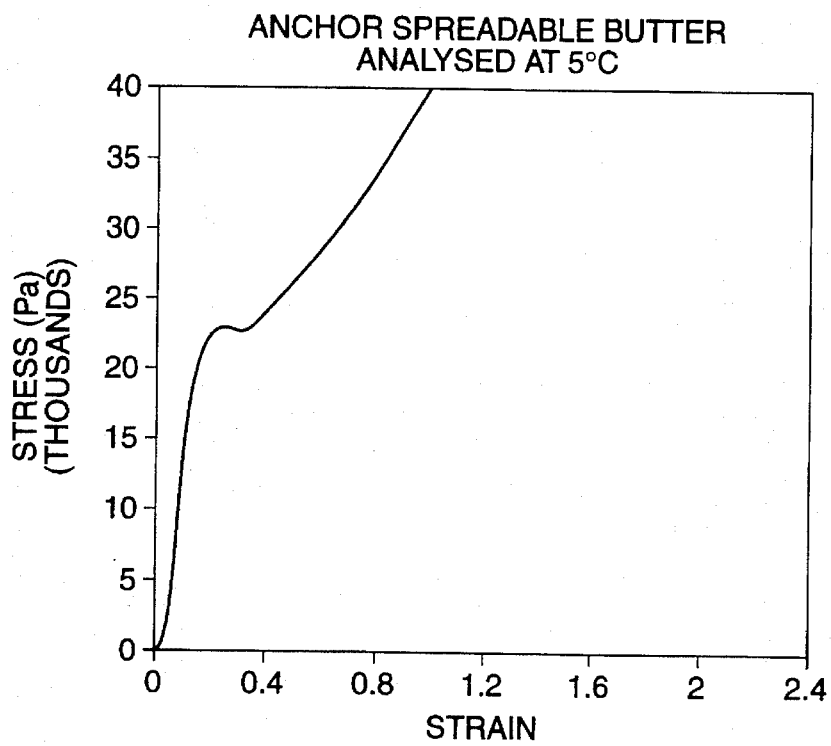
FIG. 5 shows a stress/strain graph of Anchor spreadable butter under compression analysis.

The $\sigma p/\sigma max$ ratios at 5° C. for butter and "Philadelphia" are 1.00 and 0.98 respectively. Other products showing a similar rheology are a hard margarine (FIG. 4) and a spreadable butter (FIG. 5). In these examples there is a slight hump on the curve before the horizontal or near-horizontal plastic stress region. The $\sigma p/\sigma max$ ratios are 0.95 and 0.98 respectively.

The other low fat spreads exemplified here fall into two types when subjected to compression analysis at 5° C.: those that show $\sigma p/\sigma max$ ratios of 0.75 to 0.85 and which have a more gel-like character, and those that have no $\sigma p$ or $\sigma max$ and which have more of the character of thick viscous liquids. None of these spreads shows spreading properties as good as the foregoing comparative Examples or the Examples of the present invention.

Figure 6:
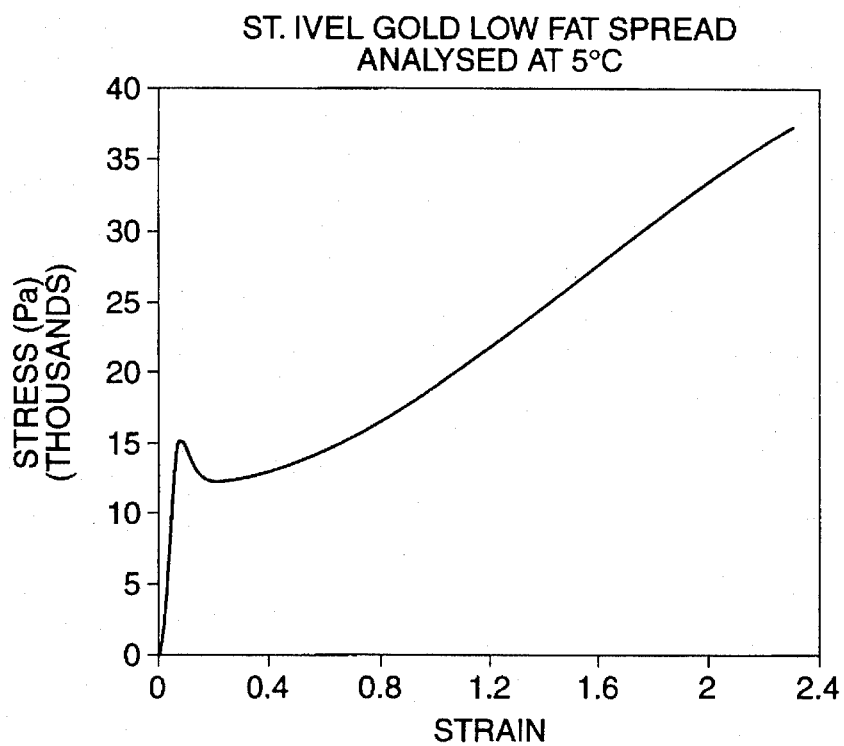
FIG. 6 shows a stress/strain graph of St. Ivel Gold low fat spread under compression analysis.
Figure 7:
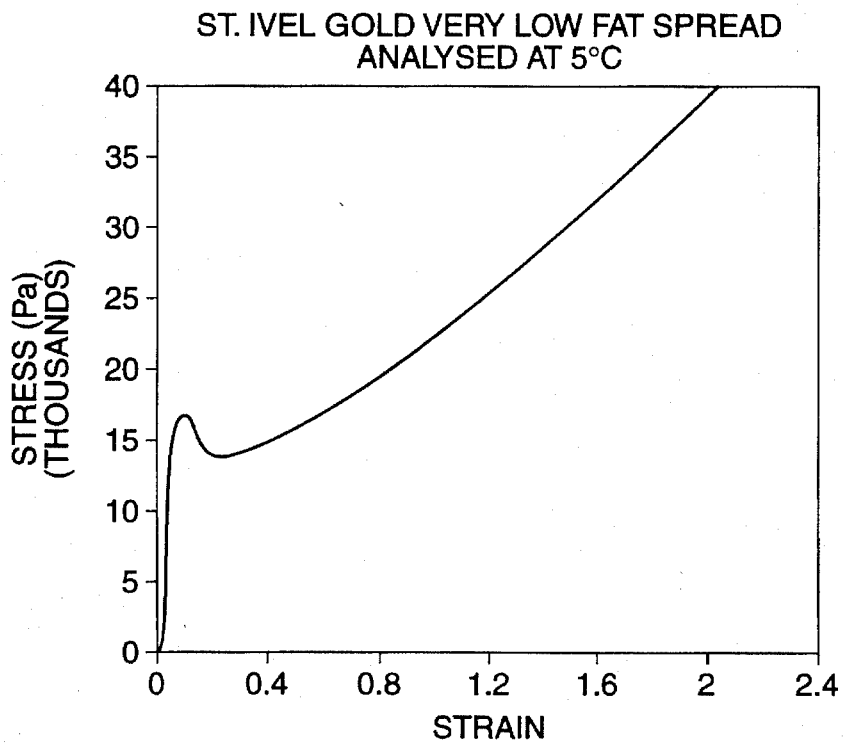
FIG. 7 shows a stress/strain graph of St. Ivel Gold Lowest low fat spread under compression analysis.
Figure 8:
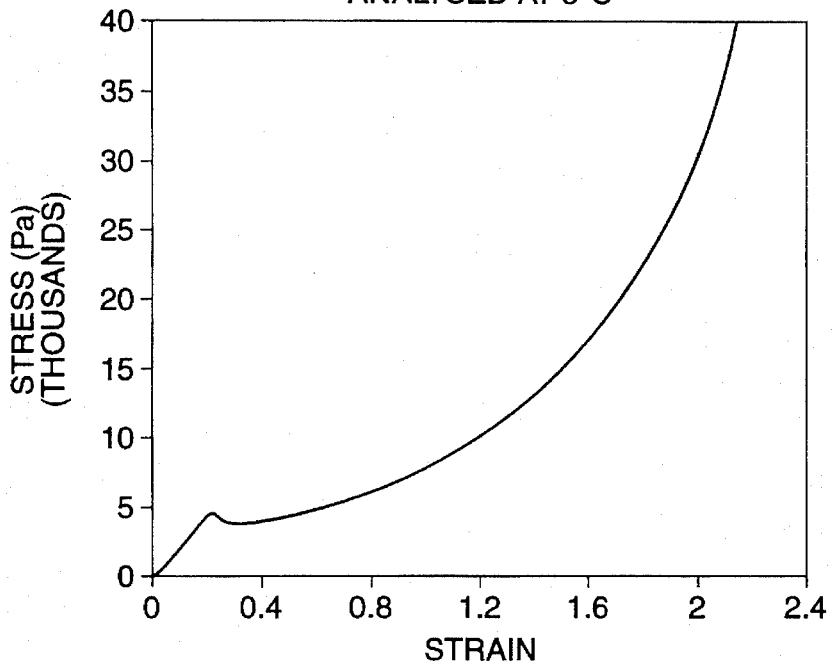
FIG. 8 shows a stress/strain graph of Promise very low fat spread (containing 3% of fat and believed to be made in accordance with EP-A-0298561) under compression analysis.
Figure 9:
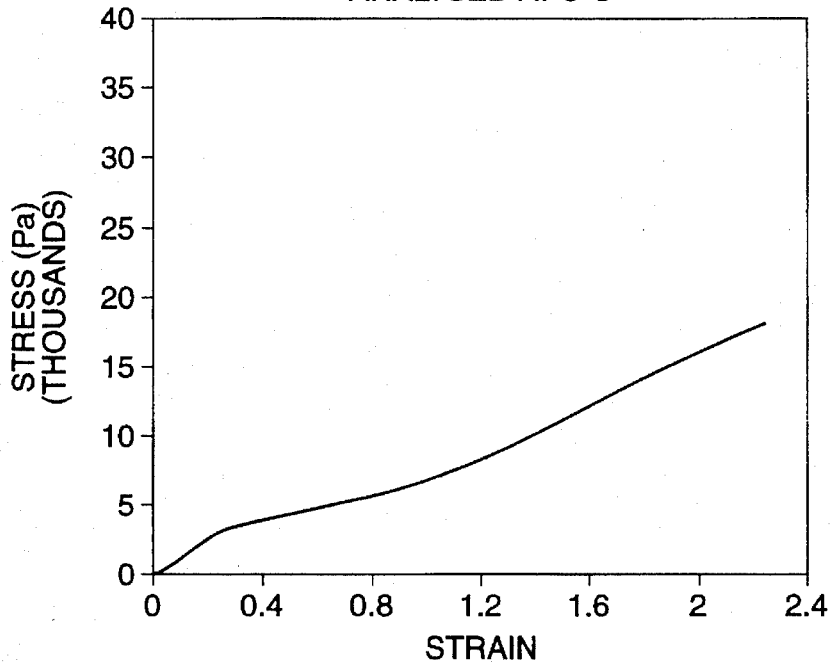
FIG. 9 shows a stress/strain graph of Safeway 5% fat very low fat spread under compression analysis.
Figure 10:
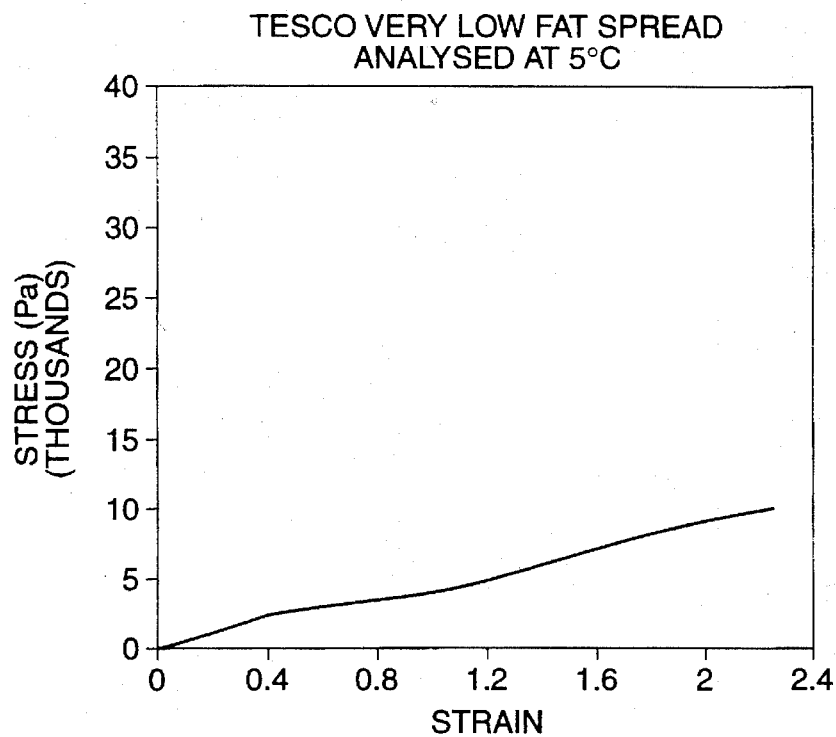
FIG. 10 shows a stress/strain graph of Tesco 5% fat very low fat spread under compression analysis.
Figure 11:
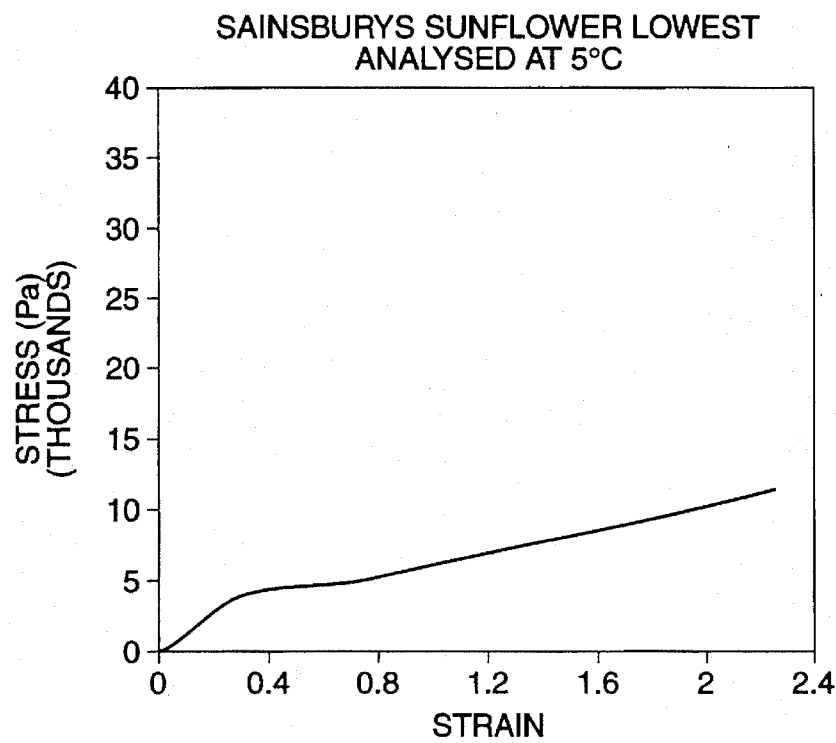
FIG. 11 shows a stress/strain graph of Sainsbury's Sunflower Lowest low fat spread under compression analysis.
Figure 12:
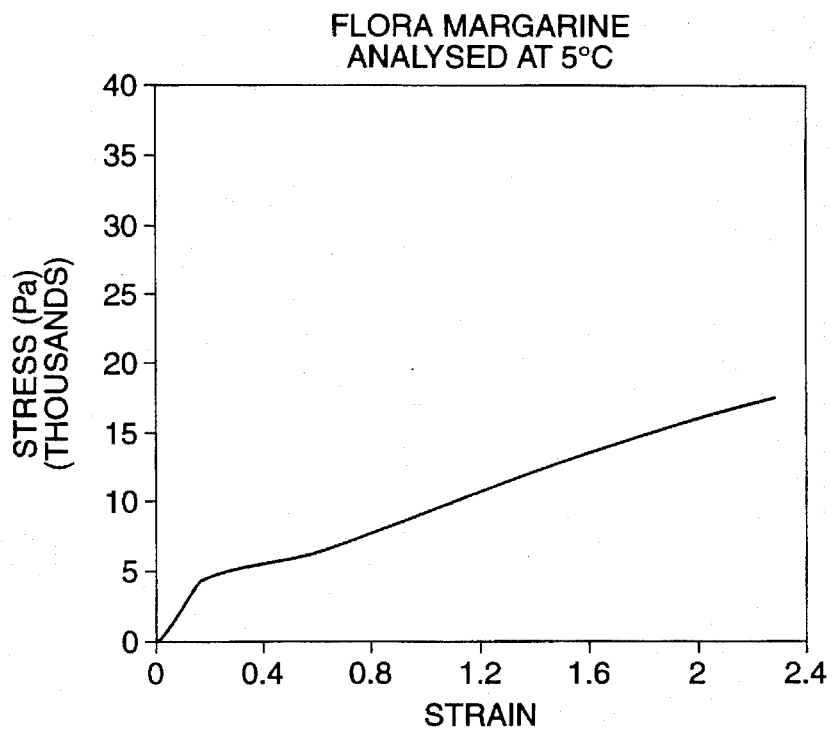
FIG. 12 shows a stress/strain graph of Flora margarine under compression analysis.

Stress/strain graphs for three of the first type of spread are shown in FIGS. 6 to 8. They are a 39% fat low fat spread with a $\sigma p/\sigma max$ ratio of 0.83, a 25% fat low fat spread with a $\sigma p/\sigma max$ ratio of 0.81, and a 3% fat very low fat spread with a $\sigma p/\sigma max$ ratio of 0.78. The first two spreads are fat-continuous emulsions whilst the third is a water-continuous emulsion believed to be made according to EP-A-0298561. The more gel-like character of these spreads is shown by the more pronounced peak at $\epsilon max$, as the product breaks under increasing strain.

Stress/strain graphs for four of the second type of spread are shown in FIGS. 9 to 12. These show only an inflection on the curve as the strain increases, and there is no horizontal or near-horizontal region in the curve. The products are respectively a 5% fat very low fat spread, two 20% fat low fat spreads, and a polyunsaturated margarine. Ratios for $\sigma p/\sigma max$ cannot be calculated for these products, which have more of the character of very viscous liquids. The three low or very low fat spreads are water-continuous emulsions, whilst the polyunsaturated margarine is fat continuous.

Figure 13:
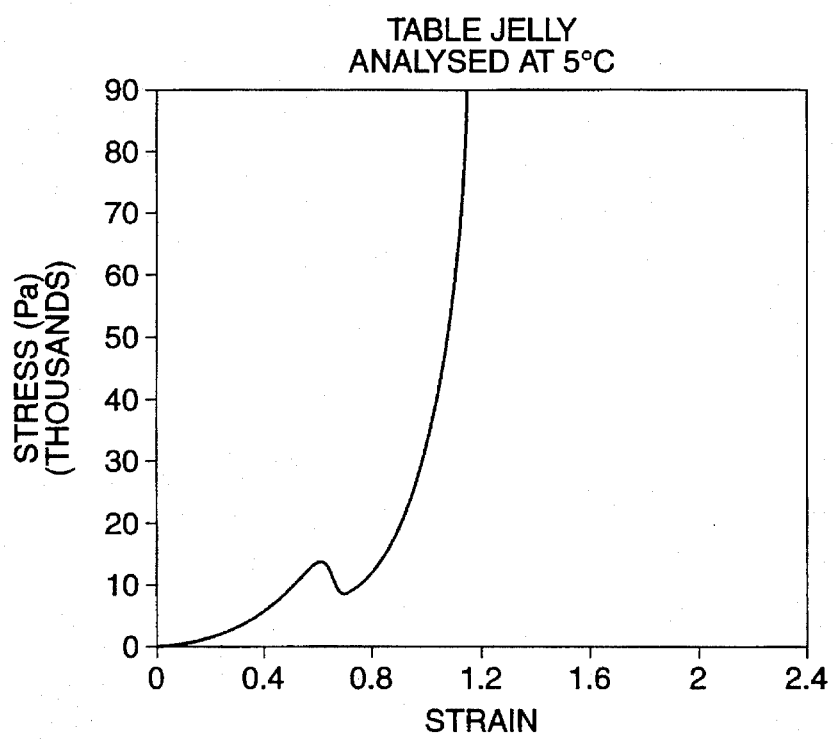
FIG. 13 shows a stress/strain graph of table jelly under compression analysis.

FIG. 13 shows a stress/strain graph giving a typical textural profile of a table jelly, refrigerated for 24 hours and then analysed to 10% of the original height (i.e. 90% compression) at 5° C. The values of $\sigma i/\sigma max$ (0.61) and $\epsilon max$ (0.62) obtained from the graph are characteristic of an elastic gel.

Figure 16:
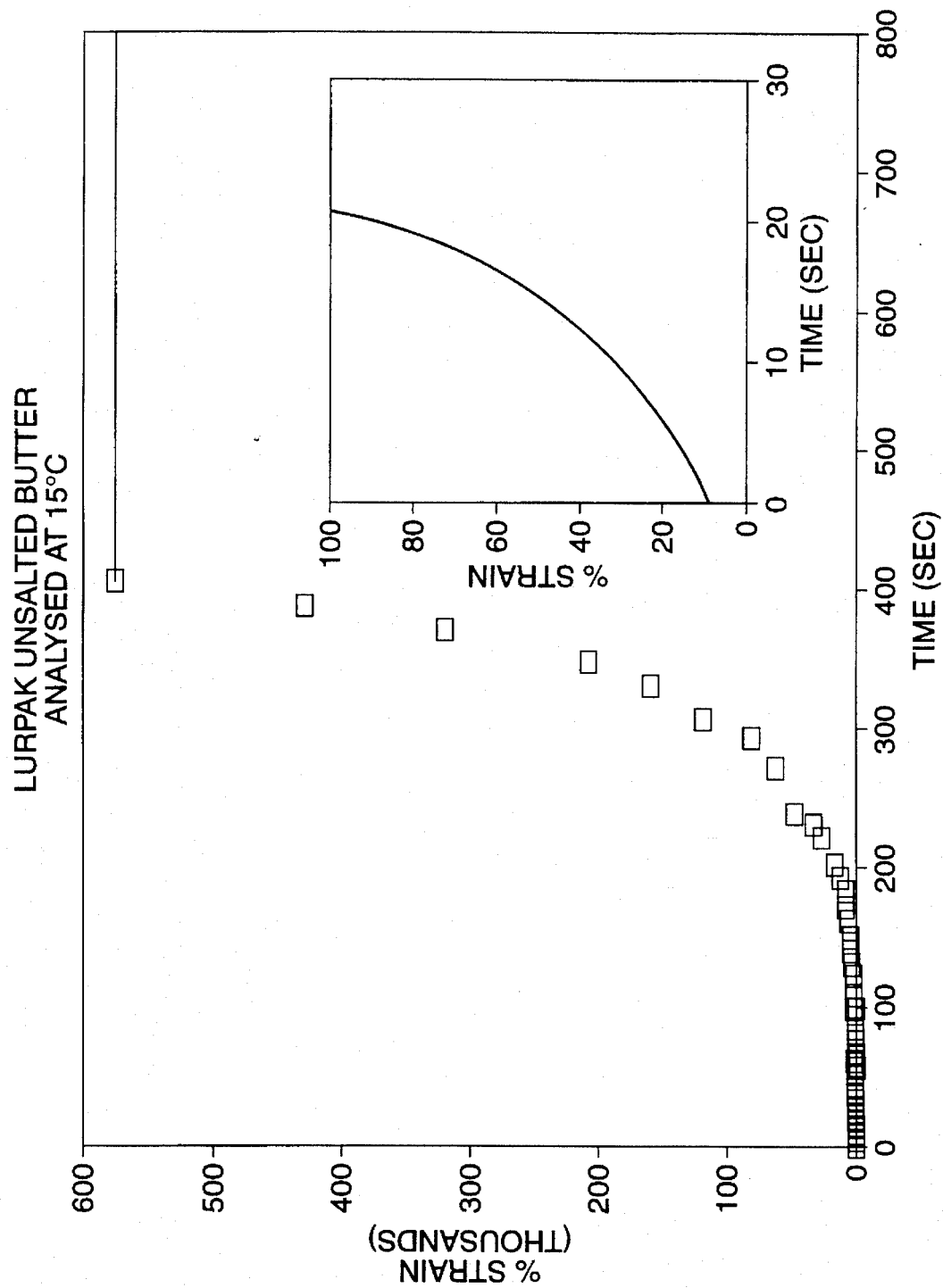
FIG. 16 shows a graph of percentage strain against time for Lurpak unsalted butter in a creep compliance experiment on application of a stress sufficient to give an 8% instantaneous deformation and after removal of that stress.
Figure 17:
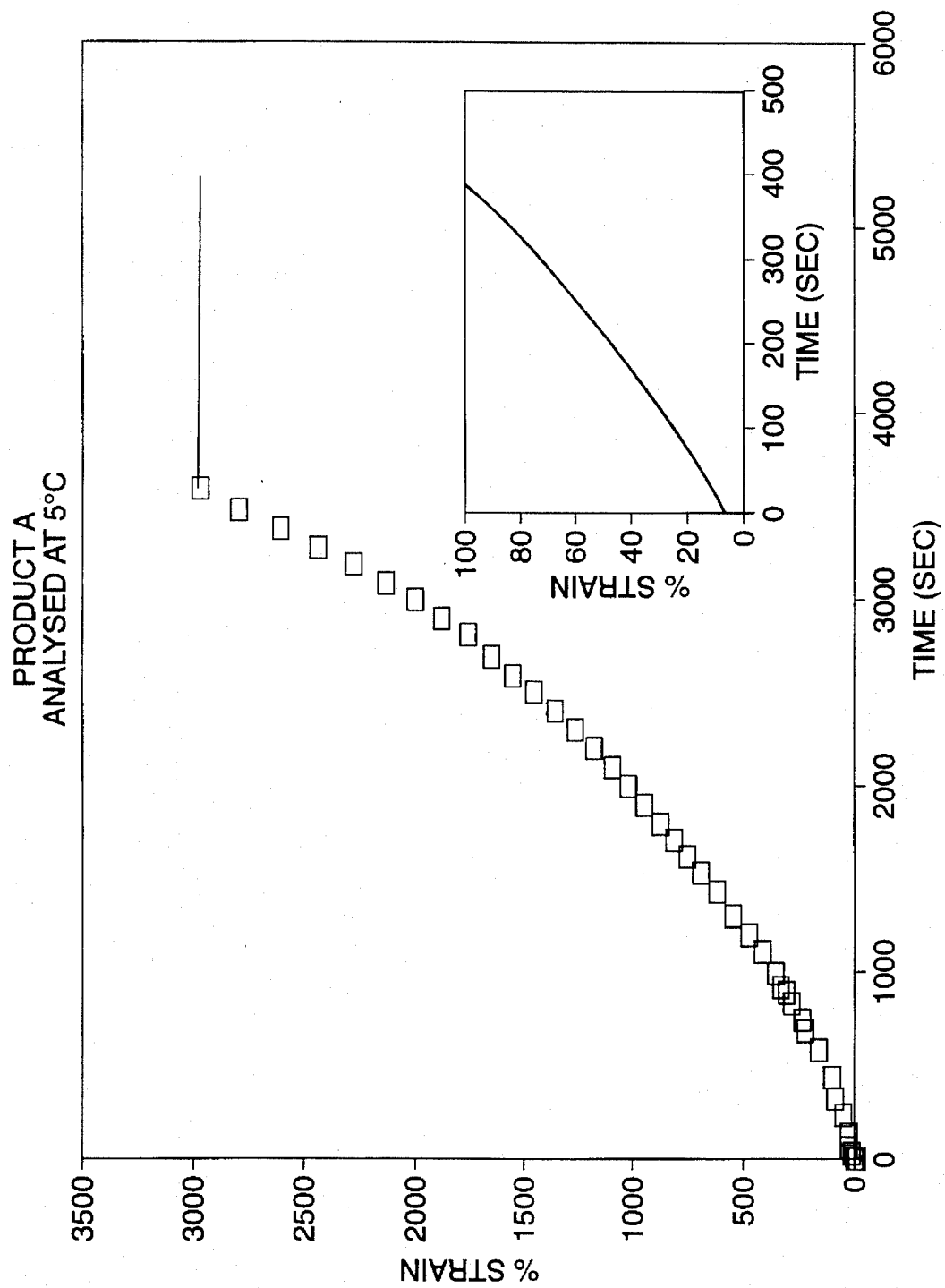
FIG. 17 shows a graph of percentage strain against time for Product A (made according to the present invention) in a creep compliance experiment on application of a stress sufficient to give an 8% instantaneous deformation and after removal of that stress.
Figure 18:
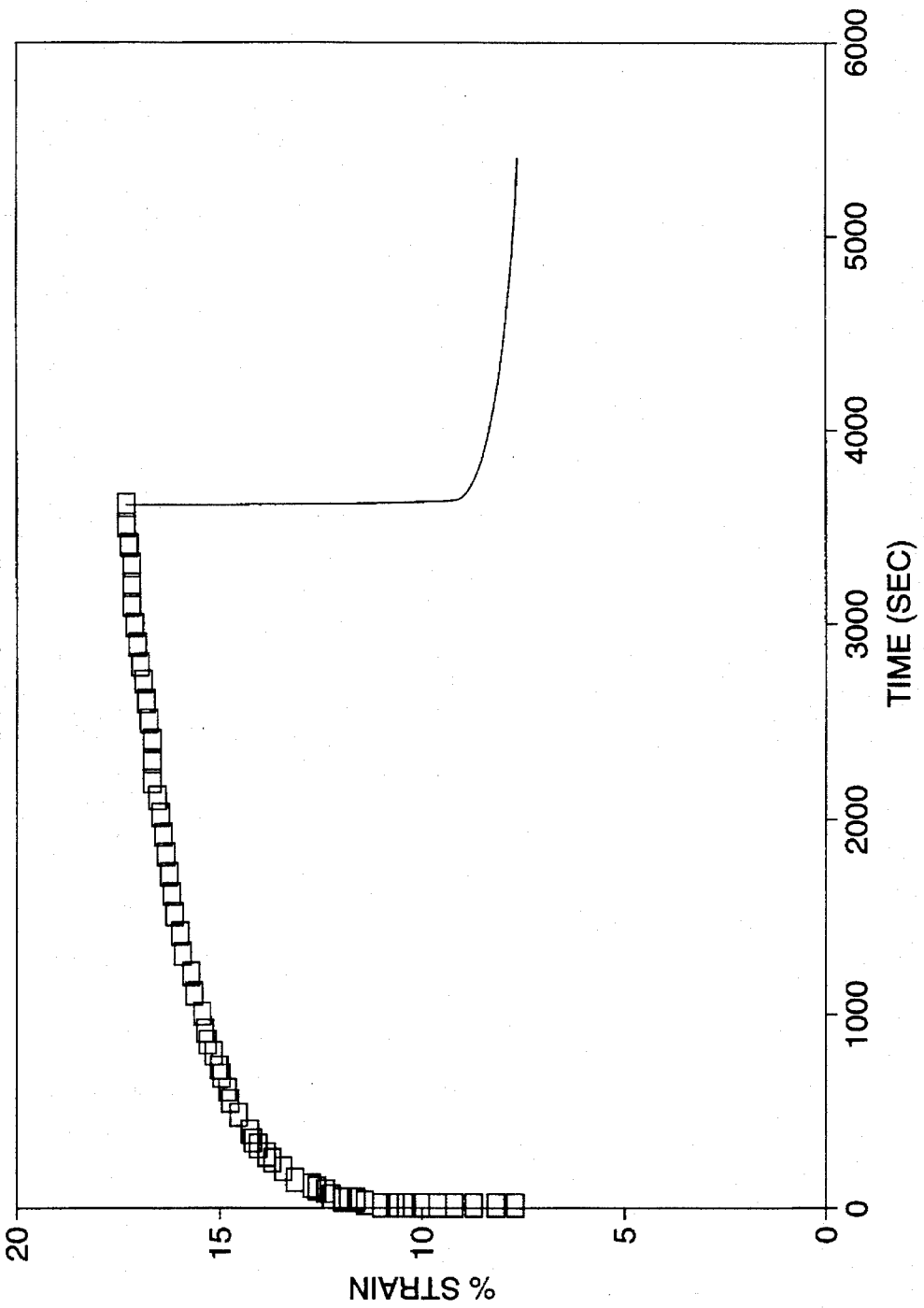
FIG. 18 shows a graph of percentage strain against time for Promise (a 3% fat very low fat spread believed to be made in accordance with EP-A-0298561) in a creep compliance experiment on application of a stress sufficient to give an 8% instantaneous deformation and after removal of that stress.

Creep compliance experiments were also performed on samples of butter (FIG. 16), Product A of the present invention (FIG. 17), and a very low fat spread commercially available product under the trade name "Promise" and believed to be made in accordance with EP-A-0298561 (FIG. 18). In each of FIGS. 16, 17 and 18 the first part of the graph is the creep compliance (retardation curve) and the second part is the strain recovery (relaxation curve). Butter responds instantaneously to the applied stress, producing an initial deformation of 8% (inset of FIG. 16) which increases rapidly during the time of application of the constant stress (almost 600,000 units of strain in 7 minutes), thus converting its solid-like structure into a flowing viscoelastic liquid that recovers less than 0.5% of its original shape during the 30 minutes of relaxation time (only the first 7 minutes of strain recovery are shown in FIG. 16 to allow a clear presentation of the retardation curve of the experiment). Product A also shows less than 0.5% recovery of the final deformation after 30 minutes of relaxation time (FIG. 17) when the stress applied for 60 minutes produces an instantaneous strain of 8% (inset of FIG. 17). By contrast the very low fat spread of EP-A-0298561 (FIG. 18) maintains most of its structural integrity at an 8% level of initial strain and recovers 57% of the final deformation at the end of a 30 minute relaxation period. It is believed that the rather elastic response of the very low fat spread of EP-A-0298561 is the result of the relatively high concentration of gelatin in the water-continuous dispersion that imparts non-plastic, gel-like properties to the aqueous phase of the product.

Figure 19:
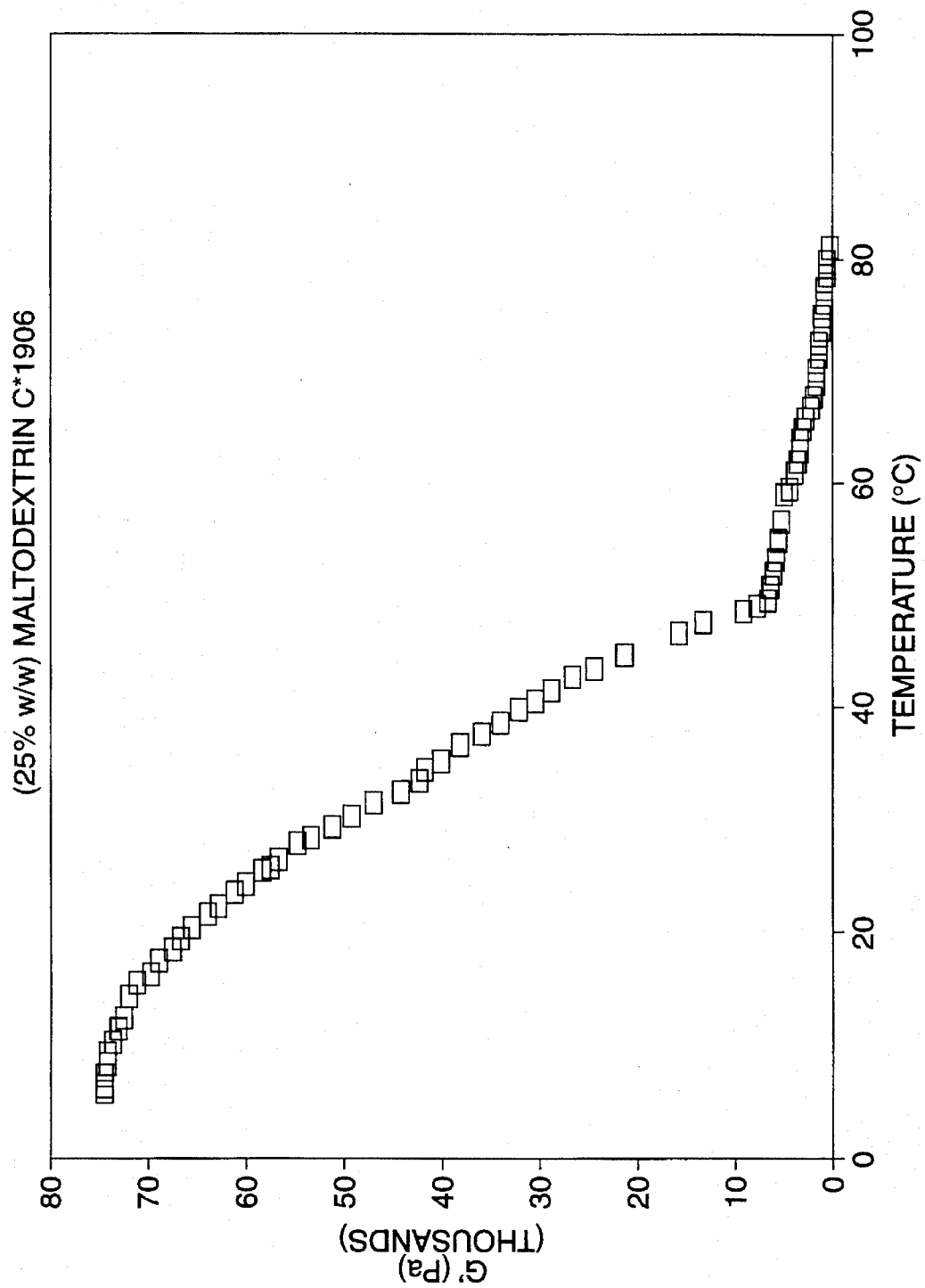
FIG. 19 shows a graph of storage modulus (G') against temperature for Cerestar C*01906 maltodextrin.
Figure 20:
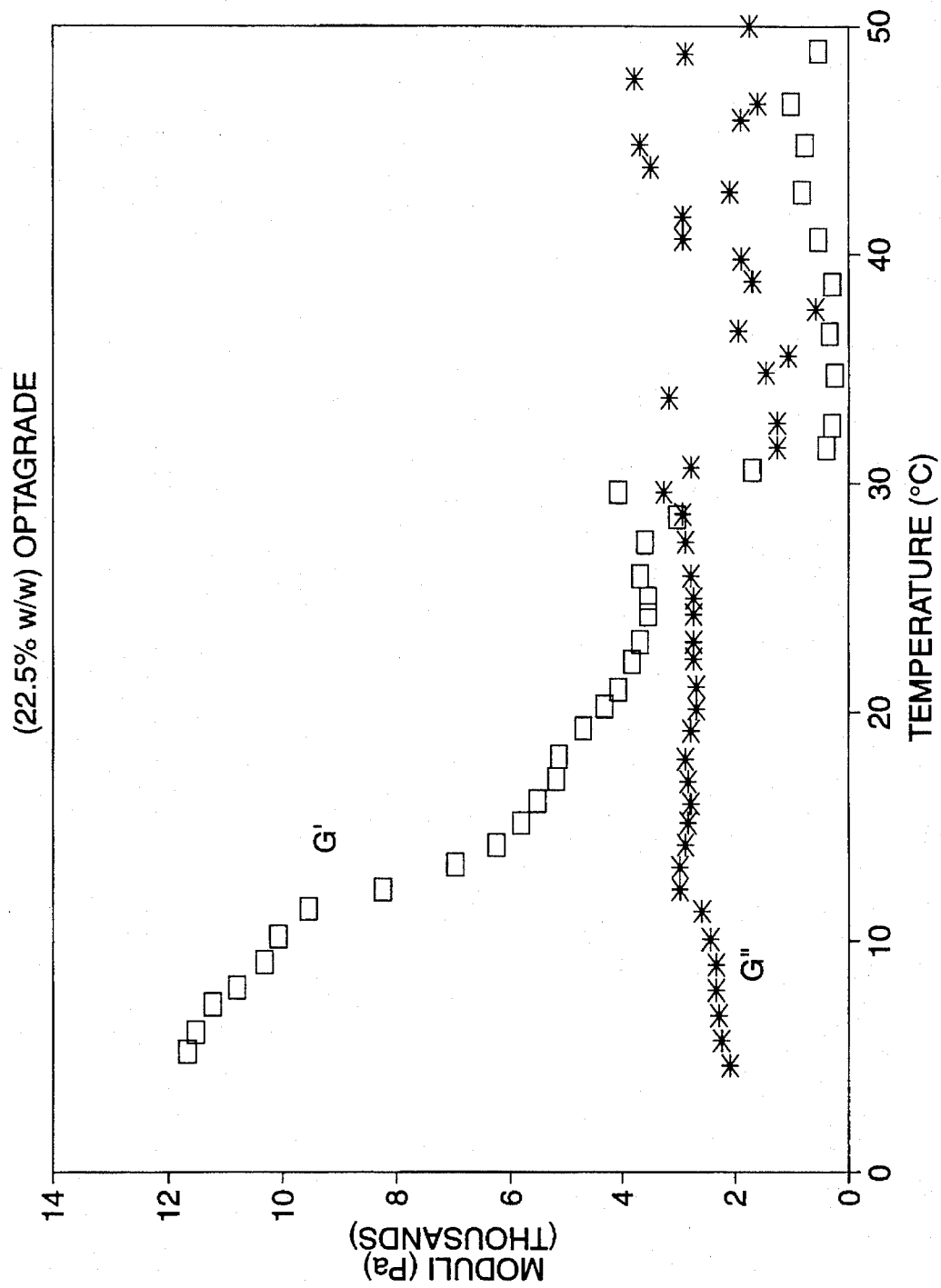
FIG. 20 shows a graph of storage modulus (G') and of loss modulus (G") against temperature for Optagrade maltodextrin.
Figure 21:
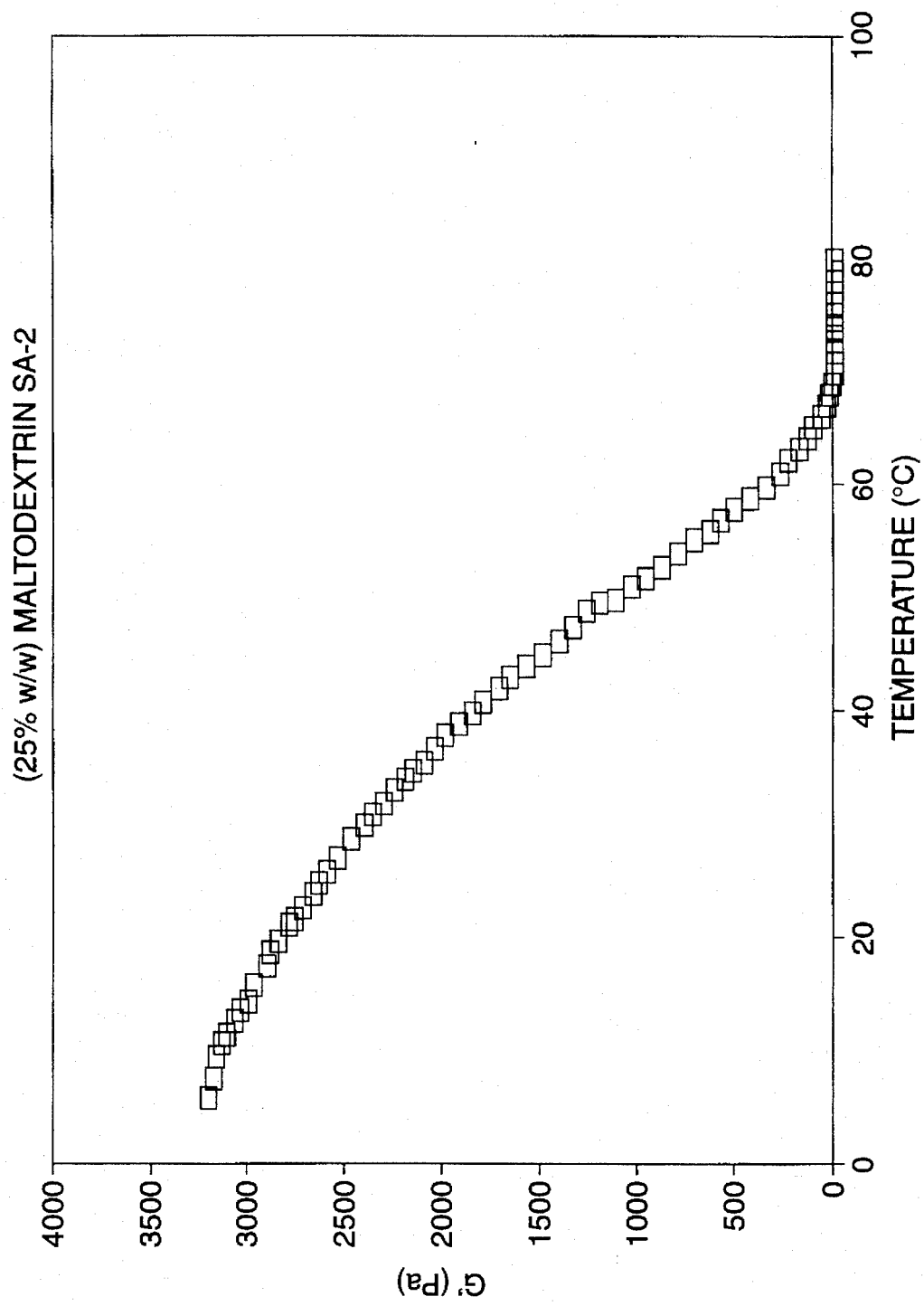
FIG. 21 shows a graph of storage modulus (G') against temperature for Paselli SA-2 maltodextrin.

Experiments were performed on various gelling maltodextrins according to the present invention to ascertain their melting profiles. The results of these experiments are presented in FIGS. 19 to 21 in which the storage modulus G' was measured as a function of temperature for Cerestar C*01906, Optagrade, and Paselli SA-2 respectively. Each experiment was performed in accordance with the standard method of dynamic oscillation [A. H. Clark, and S. B. Ross-Murphy in Adv. Polym. Sci. (1987) Vol 83, pp 57–192] using a scan rate of 1° C. per minute in the linear viscoelastic region. In the case of the Cerestar maltodextrin, 52% of the structure measured at 5° C. is lost at 37° C. In the case of the Optagrade maltodextrin, a total loss of structure is obtained when the temperature increases above 30° C. The behaviour patterns of both the Cerestar and Optagrade maltodextrins therefore contribute to a better flavour release in the mouth at 37° C., as compared to the slower, one-step melting behaviour of maltodextrins such as Paselli SA-2, which loses, at oral temperature, 37% of the structure measured at 5° C.

Example 1

Composition of Fat Phase

| 1.15 kg | Rapeseed Oil |
| --- | --- |
| 10.92 g | Colour |
| 3.9 ml | Flavouring |

Composition of Aqueous Phase

| 18.63 kg | Water |
| --- | --- |
| 1.85 kg | Buttermilk Powder |
| 2.6 kg | Cerestar C*01906 Maltodextrin |
| 338 g | Salt |
| 65 g | Potassium Sorbate |
| 39 g | Xanthan Gum |
| 1300 g | Inulin |
| | Lactic Acid (40% v/v) to pH 5.2 |

Preparation of Fat Phase

The components of the fat phase were combined and maintained at 35°–40° C. to allow the colour to dissolve in the oil.

Preparation of the Aqueous Phase

The water was heated up to 65° C. in a jacketed emulsion tank operating at slow agitation, then all the dry powders were fed through a reconstitution plant into the emulsion tank.

The pH of the aqueous phase was adjusted to 5.2 using approximately 55–65 ml of 40% (v/v) lactic acid.

Preparation and Processing of Emulsion

The oil phase was added slowly into the water phase with vigorous agitation, reduced to moderate agitation after all the fat phase was added. The emulsion was homogenised in a two-stage homogeniser at a pressure of 2500 psi first stage and 500 psi second stage.

Approximately 20 kg of the product was processed through a scraped surface heat exchanger where the product moves through a high pressure piston pump and was pasteurised at 115° C. then cooled to 75° C. The product was hot filled and stored at 3°–4° C.

The product was found to be spreadable from the fridge with good mouthfeel, meltdown and flavour release characteristics. The overall composition of the product was:

| Fat | 5.2% |
|---|---|
| Protein | 2.3% |
| Maltodextrin | 9.5% |
| Fibre (Inulin) | 5.0% |

The total carbohydrate content of the product was 11.5%.
The fat content of the product consisted of 4.8% from the Rapeseed Oil and 0.4% from the buttermilk powder.
The composition of the aqueous phase was:

| Protein | 2.4% |
|---|---|
| Maltodextrin | 10.0% |
| Inulin | 5.2% |

Figure 14:
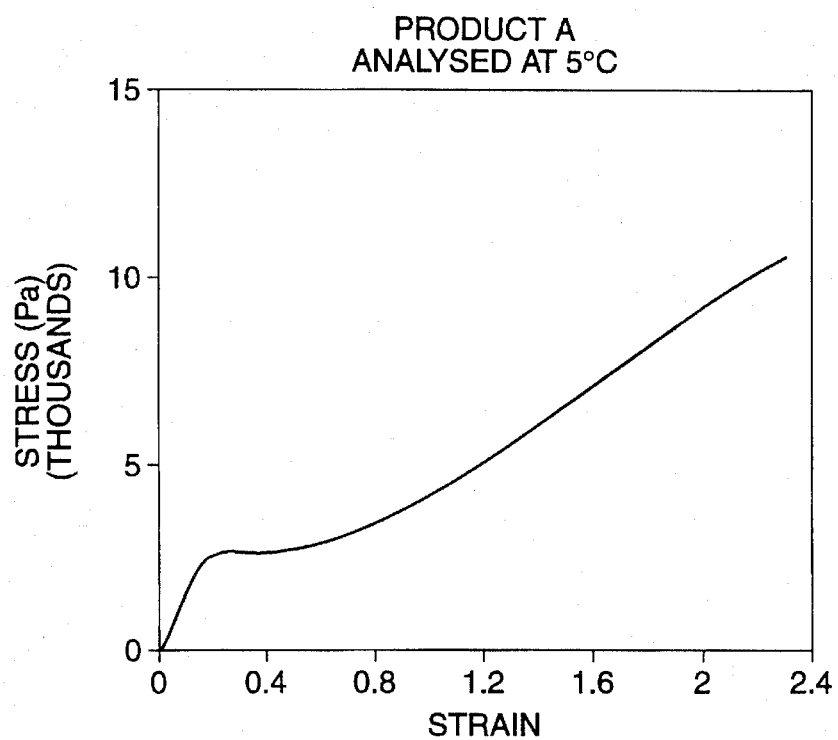
FIG. 14 shows a stress/strain graph of Product A (made according to the present invention) under compression analysis.

The rheological characteristics of the product (Product A) were measured and FIG. 14 shows a graph of stress vs. strain under compression analysis. According to this Figure the $\sigma p/\sigma max$ ratio is 0.96, $\sigma max$ is approximately 2.7 kPa and $\epsilon max$ is approximately 0.23. The results of creep compliance experiments are presented in FIG. 17.

In a preference test using a trained panel, Product A was judged to possess better texture and spreading properties than Promise very low fat spread (believed to be made according to EP- A-0298561). The Tesco and Safeway 5% fat very low fat spreads were judged to have the worst texture and spreading properties.

Example 2

Composition of Fat Phase

| 5.28 kg | Palm Oil |
|---|---|
| 3.84 kg | Hydrogenated Rapeseed Oil |
| 0.48 kg | Hydrogenated Palm Oil |
| 7.5 g | Colour |

Preparation of Emulsion

A protein concentrate (12.2% protein) was prepared from a mixture of skim milk (85%) and buttermilk (15%) by heating to 92° C. for 90 seconds, followed by cooling, bacterial souring and centrifugation. 84.5 kg of the protein concentrate, 85.6 kg of water and 9.6075 kg of the fat phase were mixed in an emulsion tank, and the pH of the mixture was adjusted to 6.4 by the addition of approximately 700 ml of sodium hydroxide solution (40% v/v). The coarse emulsion was heated to 70° C. and homogenised at 3000 psi single stage in a two-stage homogeniser.
Preparation of Spread 138.85 kg of the emulsion was weighed into a portatank. 25.0 kg of Cerestar C*01906 maltodextrin, 250 g xanthan gum, 2.20 kg sodium chloride, and 417 g of potassium sorbate were dry blended together and reconstituted into the emulsion using an MR200 pump, funnel and recirculation loop.

The product was deaerated with a Y-tron mixer and acidified to pH 5.2 with approximately 600 ml of lactic acid (40% v/v). It was then heated to 70° C., homogenised at 3000 psi, heated to 115° C. in an APV plate heat exchanger and held at that temperature for 5 seconds. The product was cooled to 80° C. through the APV plant and was hot-filled.

The overall composition of the product was:

| Fat | 4.6% |
|---|---|
| Protein | 4.7% |
| Maltodextrin | 14.2% |

The total carbohydrate content of the product was 15.9%.
The fat content of the product consisted of 4.5% from the Palm Oil, Hydrogenated Rapeseed Oil and Hydrogenated Palm Oil, and 0.1% from the buttermilk.
The composition of the aqueous phase was:

| Protein | 4.9% |
|---|---|
| Maltodextrin | 14.9% |

Figure 15:
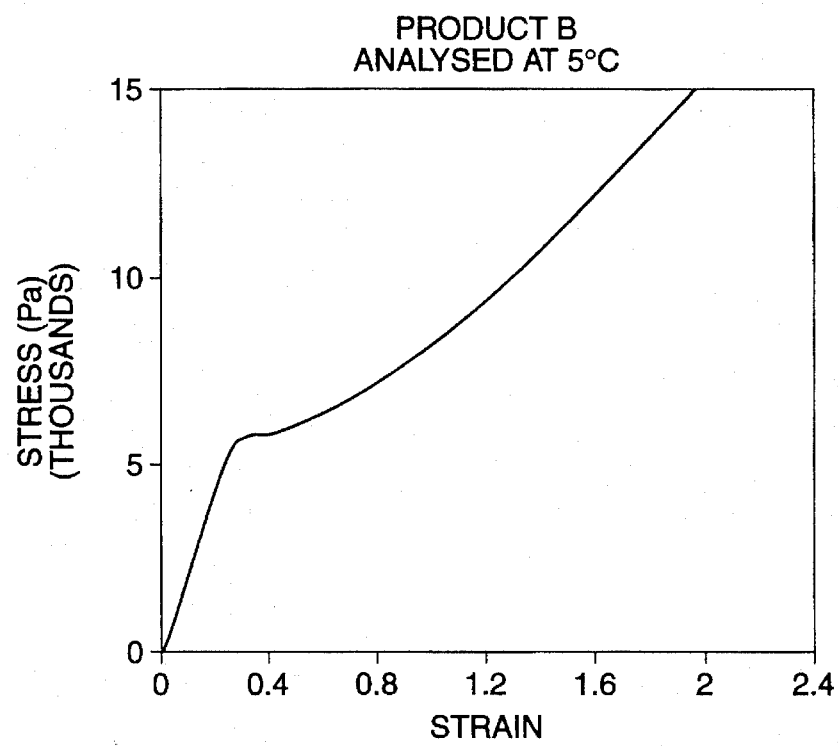
FIG. 15 shows a stress/strain graph of Product B (made according to the present invention) under compression analysis.

The rheological characteristics of the product (Product B) were measured and FIG. 15 shows the stress/strain graph under compression analysis. The $\sigma p/\sigma max$ ratio is 1.00, $\sigma max$ is approximately 5.7 kPa and $\epsilon max$ is approximately 0.29.

Microbiological Stability

Product B showed excellent microbiological stability with respect to gram-positive bacteria, including aerobic and anaerobic spore-forming bacteria. This was a surprising result because the spread possesses a very high water activity (around 0.98) and would not be expected to be so microbiologically stable, even at the levels of pH (5.0–5.2) and potassium sorbate (2500 ppm) used.

A batch of spread prepared according to Example 2 (product B) was inoculated with a mixed suspension of spores of *Bacillus cereus*, *Bacillus subtiliformis*, *Clostridium sporogenes* and *Clostridium butyricum* to a final level of 250 spores/ml. Samples of the spread were incubated at 8° C., 18° C., 25° C. and 30° C. for ten weeks and were analysed by the spread plate count method for the four inoculated spore-forming bacteria, for other anaerobic bacteria and for other aerobic bacteria. Uninoculated samples were also incubated at these temperatures and at 37° C. and were similarly analysed for bacterial content.

In all of the samples held at 8° C., 18° C. and 25° C. and analysed weekly, there was no or little increase in the bacterial content of any of the inoculated organisms or of any other bacteria over the ten week incubation period. Even the samples incubated at 30° C. and 37° C. for ten weeks showed little or no increase in bacterial counts at the end of this period. There was no significant difference between the behaviour of inoculated and uninoculated samples. The maximum increase in bacterial count was from less than 100 to 1200 over the ten week period.

Example 3

Composition of Fat Phase

| 1.16 kg | Rapeseed Oil |
|---|---|
| 11 g | Colour |
| 4 g | Flavouring |

Composition of Aqueous Phase

| 18.63 kg | Water |
|---|---|
| 1.85 kg | Buttermilk Powder |
| 3.90 kg | Cerestar C*01906 Maltodextrin |
| 338 g | Salt |
| 65 g | Potassium Sorbate |
| 39 g | Xanthan Gum |
| | Lactic Acid (40% v/v) to pH 5.2 |

Preparation of Fat Phase

The components of the fat phase were combined and maintained at 35°–40° C. to allow the colour to dissolve in the oil.

Preparation of the Aqueous Phase

The water was heated up to 65° C. in a jacketed emulsion tank operating at slow agitation, then all the dry powders were fed through a reconstitution plant into the emulsion tank.

The pH of the aqueous phase was adjusted to 5.2 using approximately 55–65 ml of 40% (v/v) lactic acid.

Preparation and Processing of Emulsion

The oil phase was added slowly into the aqueous phase with vigorous agitation, reduced to moderate agitation after all the fat phase was added. The emulsion was homogenised in a two-stage homogeniser at a pressure of 2500 psi first stage and 500 psi second stage.

Approximately 20 kg of the product was processed through a scraped surface heat exchanger where the product moves through a high pressure piston pump and was pasteurised at 115° C. then cooled to 85° C. The product was hot filled and stored at 3°–4° C.

The product was found to be spreadable from the fridge with good mouthfeel, meltdown and flavour release characteristics. The overall composition of the product was:

| | |
|---|---|
| Fat | 4.9% |
| Protein | 2.3% |
| Maltodextrin | 14.3% |

The composition of the aqueous phase was:

| | |
|---|---|
| Protein | 2.4% |
| Maltodextrin | 14.9% |

The rheological characteristics of the product were measured using compression analysis and the $\sigma p/\sigma max$ ratio was found to be 0.95.

Example 4

Composition of Fat Phase

| | |
|---|---|
| 3.85 kg | Rapeseed Oil |
| 36 g | Colour |
| 13 g | Flavouring |

Composition of Aqueous Phase

| | |
|---|---|
| 14.28 kg | Water |
| 1.85 kg | Buttermilk Powder |
| 5.52 kg | Cerestar C*01906 Maltodextrin |
| 338 g | Salt |
| 65 g | Potassium Sorbate |
| 39 g | Xanthan Gum |
| | Lactic Acid (40% v/v) to pH 5.2 |

Preparation of Product

The fat phase and aqueous phase were prepared and processed to form a spread as in Example 3.

The overall composition of the product was:

| | |
|---|---|
| Fat | 15.4% |
| Protein | 2.3% |
| Maltodextrin | 20.2% |

The composition of the aqueous phase was:

| | |
|---|---|
| Protein | 2.7% |
| Maltodextrin | 23.8% |

The rheological characteristics of the product were measured using compression analysis and the $\sigma p/\sigma max$ ratio was found to be 0.99.

Example 5

Composition of Fat Phase

| | |
|---|---|
| 1.03 kg | Rapeseed Oil |
| 10 g | Colour |
| 3.5 g | Flavouring |

Composition of Aqueous Phase

| | |
|---|---|
| 18.30 kg | Water |
| 1.85 kg | Buttermilk Powder |
| 3.12 kg | Cerestar C*01906 Maltodextrin |
| 1.24 kg | Inulin Solution (35% Inulin) |
| 338 g | Salt |
| 65 g | Potassium Sorbate |
| 39 g | Xanthan Gum |
| | Lactic Acid (40% v/v) to pH 5.2 |

Preparation of Product

The fat phase and aqueous phase were prepared and processed to form a spread as in Example 3.

The overall composition of the product was:

| | |
|---|---|
| Fat | 4.4% |
| Protein | 2.3% |
| Maltodextrin | 11.4% |
| Inulin | 1.7% |

The composition of the aqueous phase was:

| | |
|---|---|
| Protein | 2.4% |
| Maltodextrin | 11.9% |
| Inulin | 1.75% |

The rheological characteristics of the product were measured using compression analysis and the $\sigma p/\sigma max$ ratio was found to be 0.96.

Example 6

Composition of Fat Phase

| |
|---|
| 2.6 kg Cream (40% fat) |

Composition of Aqueous Phase

| | |
|---|---|
| 15.68 kg | Water |
| 2.08 kg | Buttermilk Powder |
| 5.20 kg | Paselli SA2 Maltodextrin |
| 338 g | Salt |
| 65 g | Potassium Sorbate |
| 39 g | Xanthan Gum |
| | Lactic Acid (40% v/v) to pH 5.2 |

Preparation of Product

The aqueous phase was prepared as in Example 3, and the cream was mixed in to form the emulsion, which was then processed to form the spread as in Example 3.

The overall composition of the product was:

| Fat | 4.4% |
|---|---|
| Protein | 2.6% |
| Maltodextrin | 19.0% |

The composition of the aqueous phase was:

| Protein | 2.85% |
|---|---|
| Maltodextrin | 21.1% |

The rheological characteristics of the product were measured using compression analysis and the σp/σmax ratio was found to be 1.00.

Example 7

Composition of Fat Phase

| 1.03 kg | Rapeseed Oil |
|---|---|
| 10 g | Colour |
| 3.5 g | Flavouring |

Composition of Aqueous Phase

| 18.98 kg | Water |
|---|---|
| 3.12 kg | Skimmed Milk Powder |
| 0.39 kg | Sodium Caseinate |
| 1.50 kg | National Starch & Chemical N-Lite D Maltodextrin |
| 0.52 kg | National Starch & Chemical Frigex W Modified Starch |
| 338 g | Salt |
| 65 g | Potassium Sorbate |
| 39 g | Xanthan Gum |
| | Lactic Acid (40% v/v) to pH 5.2 |

Preparation of Product

The fat phase and aqueous phase were prepared and processed to form a spread as in Example 3.
The overall composition of the product was:

| Fat | 4.1% |
|---|---|
| Protein | 5.5% |
| Maltodextrin | 5.5% |
| Modified Starch | 1.9% |

The composition of the aqueous phase was:

| Protein | 5.75% |
|---|---|
| Maltodextrin | 5.75% |
| Modified Starch | 2.0% |

The rheological characteristics of the product were measured using compression analysis and the σp/σmax ratio was found to be 0.99.

Example 8

Composition of Fat Phase

| 2.56 kg | Rapeseed Oil |
|---|---|
| 33 g | Colour |
| 8.5 g | Flavouring |

Composition of Aqueous Phase

| 17.17 kg | Water |
|---|---|
| 2.60 kg | Skimmed Milk Powder |
| 2.60 kg | Cerestar C*01906 Maltodextrin |
| 0.52 kg | National Starch & Chemical N-Lite D Maltodextrin |
| 338 g | Salt |
| 65 g | Potassium Sorbate |
| 103 g | Xanthan Gum |
| | Lactic Acid (40% v/v) to pH 5.2 |

Preparation of Product

The fat phase and aqueous phase were prepared and processed to form a spread as in Example 3.
The overall composition of the product was:

| Fat | 10.1% |
|---|---|
| Protein | 3.5% |
| Maltodextrin | 11.4% |

The composition of the aqueous phase was:

| Protein | 3.9% |
|---|---|
| Maltodextrin | 12.7% |

The rheological characteristics of the product were measured using compression analysis and the σp/σmax ratio was found to be 1.00.

Example 9

Composition of Aqueous Phase

| 19.61 kg | Water |
|---|---|
| 5.20 kg | Paselli SA2 Maltodextrin |
| 0.74 kg | Buttermilk Powder |
| 338 g | Salt |
| 65 g | Potassium Sorbate |
| 40 g | Xanthan Gum |
| | Lactic Acid (40% v/v) to pH 5.2 |

Preparation of Product

The aqueous phase was prepared and processed to form a spread as in Example 3.
The overall composition of the product was:

| Fat | 0.15% |
|---|---|
| Protein | 0.9% |
| Maltodextrin | 19.0% |

The rheological characteristics of the product were measured using compression analysis and the σp/σmax ratio was found to be 0.99.

Example 10

Composition of Fat Phase

| 4.88 kg | Rapeseed Oil |
|---|---|
| 49 g | Colour |
| 17 g | Flavouring |

Composition of Aqueous Phase

| 13.86 kg | Water |
|---|---|
| 3.90 kg | Buttermilk Powder |

| 2.60 kg | Cerestar C*01906 Maltodextrin |
| 338 g | Salt |
| 65 g | Potassium Sorbate |
| 40 g | Xanthan Gum |
| | Lactic Acid (40% v/v) to pH 5.2 |

Preparation of Product

The fat phase and aqueous phase were prepared and processed to form a spread as in Example 3.

The overall composition of the product was:

| Fat | 20.0% |
| Protein | 4.8% |
| Maltodextrin | 9.5% |

The composition of the aqueous phase was:

| Protein | 6.0% |
| Maltodextrin | 11.9% |

The rheological characteristics of the product were measured using compression analysis and the $\sigma p/\sigma max$ ratio was found to be 0.98.

Example 11

Composition of Fat Phase

| 4.88 kg | Rapeseed Oil |
| 49 g | Colour |
| 17 g | Flavouring |

Composition of Aqueous Phase

| 13.21 kg | Water |
| 3.90 kg | Buttermilk Powder |
| 3.25 kg | Cerestar C*01906 Maltodextrin |
| 338 g | Salt |
| 65 g | Potassium Sorbate |
| 40 g | Xanthan Gum |
| | Lactic Acid (40% v/v) to pH 5.2 |

Preparation of Product

The fat phase and aqueous phase were prepared and processed to form a spread as in Example 3.

The overall composition of the product was:

| Fat | 20.0% |
| Protein | 4.8% |
| Maltodextrin | 11.9% |

The composition of the aqueous phase was:

| Protein | 6.0% |
| Maltodextrin | 14.8% |

The rheological characteristics of the product were measured using compression analysis and the $\sigma p/\sigma max$ ratio was found to be 0.96.

Example 12

Composition of Fat Phase

| 1.16 kg | Sunflower Oil |
| 11 g | Colour |
| 4 g | Flavouring |

Composition of Aqueous Phase

| 16.15 kg | Water |
| 0.70 kg | Buttermilk Powder |
| 3.90 kg | Cerestar M01908 Maltodextrin |
| 2.60 kg | Paselli SA2 Maltodextrin |
| 1.03 kg | Inulin Solution (35% Inulin) |
| 338 g | Salt |
| 65 g | Potassium Sorbate |
| 40 g | Xanthan Gum |
| | Lactic Acid (40% v/v) to pH 5.2 |

Preparation of Product

The fat phase and aqueous phase were prepared and processed to form a spread as in Example 3.

The overall composition of the product was:

| Fat | 4.6% |
| Protein | 0.9% |
| Maltodextrin | 23.8% |
| Inulin | 1.4% |

The composition of the aqueous phase was:

| Protein | 0.9% |
| Maltodextrin | 24.9% |
| Inulin | 1.5% |

The rheological characteristics of the product were measured using compression analysis and the $\sigma p/\sigma max$ ratio was found to be 0.99.

Example 13

Composition of Fat Phase

| 5.01 kg | Sunflower Oil |
| 49 g | Colour |
| 17 g | Flavouring |

Composition of Aqueous Phase

| 15.57 kg | Water |
| 1.66 kg | Lactalbumin 75 Whey Protein Concentrate (75% Protein) |
| 2.34 kg | Cerestar C*01906 Maltodextrin |
| 0.78 kg | National Starch & Chemical N-Lite D Maltodextrin |
| 338 g | Salt |
| 65 g | Potassium Sorbate |
| 40 g | Xanthan Gum |
| | Lactic Acid (40% v/v) to pH 5.2 |

Preparation of Product

The fat phase and aqueous phase were prepared and processed to form a spread as in Example 3.

The overall composition of the product was:

| | |
|---|---|
| Fat | 20.0% |
| Protein | 4.8% |
| Maltodextrin | 11.4% |

The composition of the aqueous phase was:

| | |
|---|---|
| Protein | 6.0% |
| Maltodextrin | 14.3% |

The rheological characteristics of the product were measured using compression analysis and the σp/σmax ratio was found to be 1.00.

Example 14

Composition of Fat Phase

| | |
|---|---|
| 1.03 kg | Rapeseed Oil |
| 10 g | Colour |
| 3.5 g | Flavouring |

Composition of Aqueous Phase

| | |
|---|---|
| 19.57 kg | Water |
| 2.60 kg | Buttermilk Powder |
| 0.52 kg | Sodium Caseinate |
| 0.78 kg | Cerestar M01908 Maltodextrin |
| 0.78 kg | Optagrade Maltodextrin |
| 0.26 kg | National Starch & Chemical Frigex W Modified Starch |
| 338 g | Salt |
| 65 g | Potassium Sorbate |
| 40 g | Xanthan Gum |
| | Lactic Acid (40% v/v) to pH 5.2 |

Preparation of Product

The fat phase and aqueous phase were prepared and processed to form a spread as in Example 3.

The overall composition of the product was:

| | |
|---|---|
| Fat | 4.5% |
| Protein | 4.95% |
| Maltodextrin | 5.55% |
| Modified Starch | 1.0 |

The composition of the aqueous phase was:

| | |
|---|---|
| Protein | 5.2% |
| Maltodextrin | 5.8% |
| Modified Starch | 1.0% |

The rheological characteristics of the product were measured using compression analysis and the σp/σmax ratio was found to be 0.99.

We claim:

1. A spread which is a water-continuous dispersion comprising a continuous aqueous phase and wherein the continuous aqueous phase comprises a gelling maltodextrin and an aggregate-forming proteinaceous gelling agent, and wherein substantially no gelatin is present, the components of the spread having been selected so that the spread has a ratio of plastic stress to maximum stress (σp/σmax) in the range of 0.95 to 1 when measured at 5° C. when using compression analysis on cylindrical samples of 26 mm length and 26 mm diameter, compressed at a rate of 0.8 mm per second.

2. A spread which is a water-continuous dispersion comprising a continuous aqueous phase wherein:

the continuous aqueous phase comprises (i) a gelling maltodextrin and (ii) an aggregate-forming proteinaceous gelling agent which comprises one or more milk proteins, or a mixture of one or more milk proteins and one or more vegetable proteins; and wherein substantially no gelatin is present, the components of the spread having been selected so that the spread has a ratio of plastic stress to maximum stress (σp/σmax) in the range of 0.95 to 1 when measured at 5° C. when using compression analysis on cylindrical samples of 26 mm length and 26 mm diameter, compressed at a rate of 0.8 mm per second.

3. A spread according to claim 1 or claim 2, wherein the gelling maltodextrin is present at a concentration in the range 6 to 25% by weight of the aqueous phase.

4. A spread according to claim 3, wherein the gelling maltodextrin is present at a concentration in the range 8 to 15% by weight of the aqueous phase.

5. A spread according to claim 1 or claim 2, wherein the aggregate-forming proteinaceous gelling agent is present at a concentration such that the spread contains from 1 to 6% of protein by weight of the aqueous phase.

6. A spread according to claim 5, wherein the aggregate-forming proteinaceous gelling agent is present at a concentration such that the spread contains from 2 to 5% of protein by weight of the aqueous phase.

7. A spread according to claim 2, wherein the milk protein comprises one or more members of the group consisting of buttermilk powder, buttermilk concentrate, skim milk powder, skim milk concentrate, whole milk powder, whole milk concentrate, whey protein concentrate, whey protein isolate, and a whole-milk-protein preparation which comprises substantially all of the proteins from milk substantially in their natural proportions.

8. A spread according to claim 7, wherein the aggregate-forming proteinaceous gelling agent comprises one or more whole-milk-protein preparations selected from the group consisting of:

a solution of buttermilk powder or skim milk powder or whole milk powder or a mixture thereof;

a buttermilk concentrate or a skim milk concentrate or a whole milk concentrate or a mixture thereof;

a mixture of caseinates and whey proteins; and a protein concentrate prepared by heating, souring and separating buttermilk or skim milk or whole milk or a mixture thereof.

9. A spread according to claim 2, wherein the vegetable protein comprises soya protein concentrate or soya protein isolate.

10. A spread which is a water-continuous dispersion comprising a continuous aqueous phase wherein:

the continuous aqueous phase comprises (i) a gelling maltodextrin present at a concentration in the range 6 to 25% by weight of the aqueous phase, and (ii) an aggregate-forming proteinaceous gelling agent present at a concentration such that the spread contains from 1 to 6% of protein by weight of the aqueous phase; and wherein substantially no gelatin is present, the components of the spread having been selected so that the spread has a ratio of plastic stress to maximum stress (σp/σmax) in the range of 0.95 to 1 when measured at 5° C. when using compression analysis on cylindrical samples of 26 mm length and 26 mm diameter, compressed at a rate of 0.8 mm per second.

11. A spread according to any one of claims 1, 2 or 10 further comprising up to 20% of a dispersed fat phase by weight of the spread.

12. A spread according to claim 11 wherein the dispersed fat phase contains 0 to 10% fat by weight of the spread.

13. A spread according to claim 12, wherein the dispersed fat phase contains 2 to 5% of fat by weight of the spread.

14. A spread according to any one of claims 1, 2 or 10, wherein the gelling maltodextrin loses, at around 37° C., at least 50% of the structure of the maltodextrin present at 5° C.

15. A spread according to claim 11 wherein the dispersed fat phase comprises one or more members of the group consisting of milk fat, vegetable oil, vegetable fat, animal fat and hydrogenated vegetable oil.

16. A spread according to claim 15, wherein the dispersed fat phase comprises one or more milk fats selected from the group consisting of butter, butteroil, anhydrous milk fat, fractionated milk fat, cream and concentrated cream.

17. A spread according to claim 15, wherein the dispersed fat phase comprises one or more vegetable oils or hydrogenated vegetable oils selected from the group consisting of rapeseed oil, palm oil, soya oil, sunflower oil, and their hydrogenated forms.

18. A spread according to any one of claims 1, 2 or 10, wherein substantially no non-aggregate-forming gelling agents are present.

19. A spread according to any one of claims 1, 2 or 10, further comprising a non-gelling hydrocolloid at a concentration of up to 10% by weight of the aqueous phase.

20. A spread according to claim 19, wherein the non-gelling hydrocolloid comprises one or more members of the group consisting of:

xanthan gum at a concentration of 0.1 to 0.5% by weight of the aqueous phase;

modified starch at a concentration of 0.1 to 2.5% by weight of the aqueous phase;

locust bean gum at a concentration of 0.1 to 0.5% by weight of the aqueous phase; and a soluble vegetable fibre at a concentration of 1 to 7% by weight of the aqueous phase.

21. A spread according to any one of claims 1, 2 or 10, made by a process including the step of cooling the spread to below 10° C. within 60 minutes of being filled into containers.

22. A spread which is a water-continuous dispersion comprising a continuous aqueous phase and a dispersed fat phase wherein:

(a) the continuous aqueous phase comprises a gelling maltodextrin and an aggregate-forming proteinaceous gelling agent;

(b) the dispersed fat phase contains 0 to 20% fat by weight of the spread; and (c) substantially no gelatin in present; the components of the spread having been selected (i) so that the spread has a ratio of plastic stress to maximum stress ($\sigma p/\sigma max$) in the range of 0.95 to 1 when measured at 5° C. when using compression analysis on cylindrical samples of 26 mm length and 26 mm diameter, compressed at a rate of 0.8 mm per second; and (ii) so that the spread exhibits less than 0.5% recovery of strain at the end of a 30-minute period of relaxation after having been subjected for 60 minutes to a constant shear stress which produced an instantaneous original deformation of 8%.

\* \* \* \* \*